(12) United States Patent
Gan et al.

(10) Patent No.: US 6,188,540 B1
(45) Date of Patent: Feb. 13, 2001

(54) SYSTEM, METHOD, AND DEVICE FOR A REGENERATIVE CONSTANT VELOCITY PARK FOR VOICE COIL MOTOR

(75) Inventors: Kah Liang Gan; Beng Wee Quak; Kok Hoe Chia; Chee Wai Lum, all of Singapore (SG)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/107,889

(22) Filed: Jun. 30, 1998

Related U.S. Application Data

(60) Provisional application No. 60/056,023, filed on Sep. 2, 1997.

(51) Int. Cl.[7] .................................................. G11B 5/596
(52) U.S. Cl. .......................................... 360/78.04; 360/69
(58) Field of Search ............................. 360/75.69, 78.04; 318/566, 254, 282; 330/267; 327/538, 540, 541, 328; 363/124, 131, 127; 323/349, 350, 351

(56) References Cited

U.S. PATENT DOCUMENTS

| | | | |
|---|---|---|---|
| 3,705,333 | * 12/1972 | Galetto et al. | 361/159 |
| 4,306,117 | * 12/1981 | Jacobson | 360/71 X |
| 4,831,469 | * 5/1989 | Hanson et al. | 360/75 |
| 5,455,496 | * 10/1995 | Williams et al. | 318/563 |
| 5,566,369 | 10/1996 | Carobolante . | |
| 5,838,515 | * 11/1998 | Mortazavi et al. | 360/78.12 |

* cited by examiner

Primary Examiner—W. Chris Kim
Assistant Examiner—K. Wong
(74) Attorney, Agent, or Firm—Merchant & Gould P.C.

(57) ABSTRACT

A system, method, and device for moving a plurality of heads in a disk drive is disclosed. The system comprises hard disks, read/write heads for reading from or writing to the hard disks, a voice coil motor for moving the plurality of heads, a voice coil motor driver for energizing the voice coil motor, a voltage clamp device for regulating a voltage across the voice coil motor, and a park voltage source. The voltage clamp device comprises a transistor, a switch, and a resistive divider network. During head parking, a park voltage source activates the voltage clamp device, which clamps the voltage across the voice coil motor to a fixed value, resulting in movement of the voice coil and heads towards a park location with fixed velocity.

16 Claims, 2 Drawing Sheets

SYSTEM, METHOD, AND DEVICE FOR A REGENERATIVE CONSTANT VELOCITY PARK FOR VOICE COIL MOTOR

RELATED APPLICATIONS

Embodiments of this invention relate to Provisional Application Ser. No. 60/056,023, filed Sep. 2, 1997. The contents of that application are incorporated by reference herein.

BACKGROUND OF THE INVENTION

1. Field of the Invention

Embodiments of this invention relate generally to disk drives of the type generally used for storing digital data, and in particular to methods and devices for parking the heads used in a disk drive at a constant velocity, and disk drive systems incorporating the same.

2. Description of Related Art

Modern computers require media in which digital data can be quickly stored and retrieved. Magnetizable (hard) layers on disks have proven to be a reliable media for fast and accurate data storage and retrieval. Disk drives that store and retrieve data from hard disks have thus become popular components of computer systems.

FIG. 1 illustrates a conventional disk drive system that could be used to implement embodiments of the present invention. FIG. 1 shows a disk drive system 2 comprising a disk drive microprocessor 4, control logic 6, voice coil motor driver 8, voice coil motor 10, head assembly 12, read/write heads 14, hard disks 16, spindle motor 18, and spindle motor drivers 20. In operation, a computer 22 communicates through controller 24 with the disk drive microprocessor 4. In response to commands from the controller 24, the disk drive microprocessor 4, by means of control logic 6, activates voice coil motor driver 8. The voice coil motor driver 8 energizes the voice coil motor 10 to position the head assembly 12 and read/write heads 14 over specific track locations on the hard disks 16, which are rotating at a substantially constant velocity under the impetus of the spindle motor 18 and spindle motor drivers 20. Once the read/write heads 14 have stabilized over the appropriate tracks, the read/write heads 14 can read data from, or write data to, the hard disks 16.

Those skilled in the art will recognize that the disk drive system 2 of FIG. 1 is not intended to limit embodiments of the present invention. Indeed, those skilled in the art will recognize that alternative hardware configurations may be used without departing from the scope of the present invention.

In typical disk drive systems, the hard disks rotate at high velocities and read/write heads are positioned over the hard disks with very little air gap separation. In this configuration, read/write head contact with the hard disks (a head crash) can be catastrophic. Data can be permanently lost, or the read/write heads or hard disks can be damaged such that the entire disk drive system no longer functions. Therefore, modern disk drive systems avoid head contact with the hard disks as much as possible. To minimize read/write head contact with the hard disks, many disk drives park their read/write heads when the disk drive system is powered down so that the read/write heads rest over a parking zone (an area on the hard disks where no data is stored, typically the innermost central region of the disks) instead of an area used for storing data. The use of a parking zone minimizes wear on the recording area of the disks and thus increases the reliability of the disk drive system and the integrity of the stored data. Head parking circuitry activates when the disk drive system is being powered down or when the hard disks temporarily stop spinning. Such circuitry energizes the voice coil motor and moves the read/write heads to the parked position on the hard disks.

FIG. 2 illustrates a conventional head positioning system that includes a head parking system. Under normal operating conditions where data is being written to or read from the hard disks, a voice coil motor driver 8, consisting of a first driver 8a and a second driver 8b, produces a current flow through a voice coil motor 10. This current flow magnetizes a voice coil 10a, and causes the voice coil 10a to push or pull on a fixed permanent magnet 10b surrounding the voice coil 10a. These forces of repulsion or attraction cause the voice coil 10a to move in relation to the fixed permanent magnet 10b. Because the voice coil 10a is fixedly attached to the read/write heads 14 through the head assembly 12, movement of the voice coil 10a results in movement of the read/write heads 14 in relation to the hard disks 16.

Activation of the parking circuitry is triggered by the application of a park voltage source 26 to the voice coil motor 10 through a park voltage resistive network 28. The park voltage source 26 is typically generated by stored energy in the spindle motor 18 or a storage capacitor 18a. When the park voltage source 26 is applied, a constant current is sourced through the voice coil motor 10, which magnetizes the voice coil 10a and results in movement of the voice coil 10a and fixedly attached read/write heads 14 towards the park position.

However, the constant current provided by the park voltage source 26 causes the read/write heads 14 to accelerate towards the park position, creating high gravitational forces and mechanical stress on the head assembly 12. Acceleration of the head assembly 12 and gravitational forces can be minimized if the read/write heads 14 are parked at a constant velocity. Constant velocity parking will drastically reduce the chance of head slap (heads slapping on the disc) and resultant media defects.

One proposed way of parking read/write heads at a constant velocity is disclosed in the Carobolante patent (U.S. Pat. No. 5,566,369), incorporated herein by reference, which uses a feedback loop comprised of an active component (op amp) and resistors to maintain a constant voltage across the voice coil. In Carobolante, knowledge of the resistive component of the voice coil is necessary to select proper resistor values.

SUMMARY OF THE DISCLOSURE

Therefore, it is an object of embodiments of the invention to provide a system, method, or device for parking the read/write heads in a disk drive system at a constant velocity.

It is a further object of preferred embodiments of the invention to provide a system, method, or device for parking the read/write heads in a disk drive system at a constant velocity, wherein the system, method, or device is adjustable so that the optimum park velocity can be selected.

It is a further object of preferred embodiments of the invention to provide a system, method, or device for parking the read/write heads in a disk drive system at a constant velocity which avoids the use of active feedback and the necessity of knowing the resistivity of the voice coil.

These and other objects are accomplished according to a system for moving a plurality of heads in a disk drive, wherein the system is comprised of (1) hard disks, (2) a plurality of heads for reading from or writing to the hard disks, (3) a voice coil motor for moving the plurality of heads, (4) a voice coil motor driver for energizing the voice coil motor and moving the heads during normal read/write operations, (5) a voltage clamp device for regulating the voltage across the voice coil motor and moving the heads with constant velocity during head parking, and (6) a park voltage source for energizing the voltage clamp device through a park voltage resistive network during head parking. The voltage clamp device is further comprised of (1) a first transistor for providing a constant voltage at the output of the voltage clamp device, (2) a switch for providing current to the first transistor, and (3) a voltage divider for dividing down the input voltage to the voltage clamp device and turning on the first transistor.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Modern computers require a media in which digital data can be quickly stored and retrieved. Magnetizable (hard) disks have proven to be a reliable media for fast and accurate data storage and retrieval. Disk drives that store and retrieve data from hard disks have thus become popular components of computer systems.

To minimize the dangers of read/write head contact with hard disks, many disk drives park their read/write heads when the disk drive system is powered down. However, when a park voltage from a head parking circuit is applied, the constant current sourced through the voice coil motor results in acceleration of the read/write heads and high gravitational forces, causing mechanical stress on the head assembly. Acceleration of the head assembly and resultant gravitational forces can be minimized if the read/write heads are parked at a constant velocity. Thus, preferred embodiments of the present invention relate to a system, method, and device for parking the read/write heads in a disk drive at a constant velocity.

Figure 1:
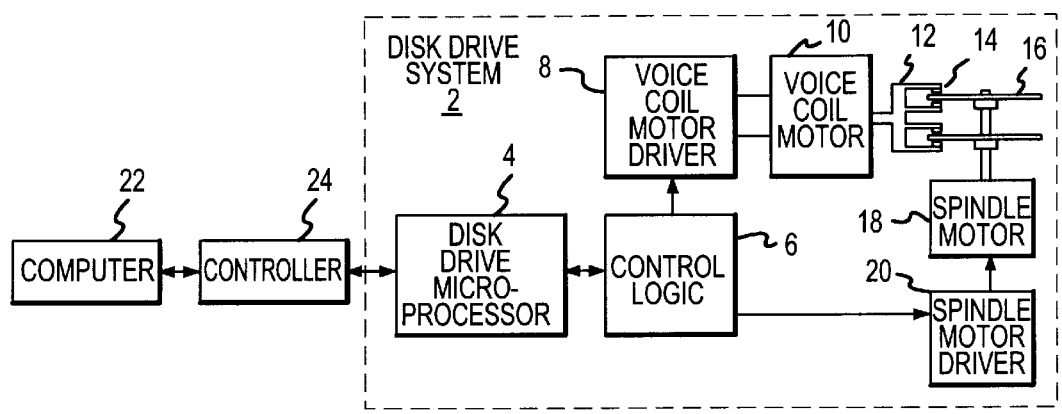
FIG. 1 is a block diagram of a conventional disk drive system.
Figure 2:
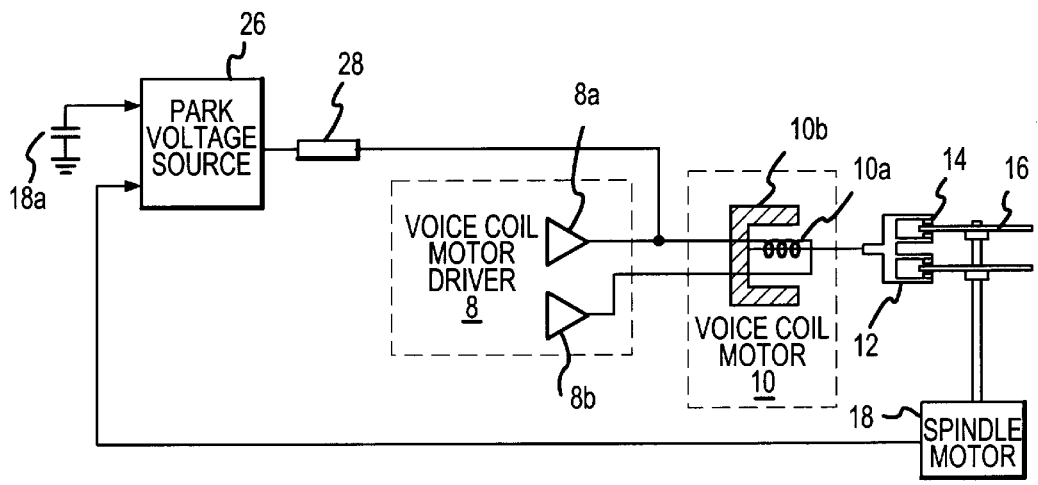
FIG. 2 is a symbolic diagram of a conventional head positioning system that includes a head parking system.
Figure 3:
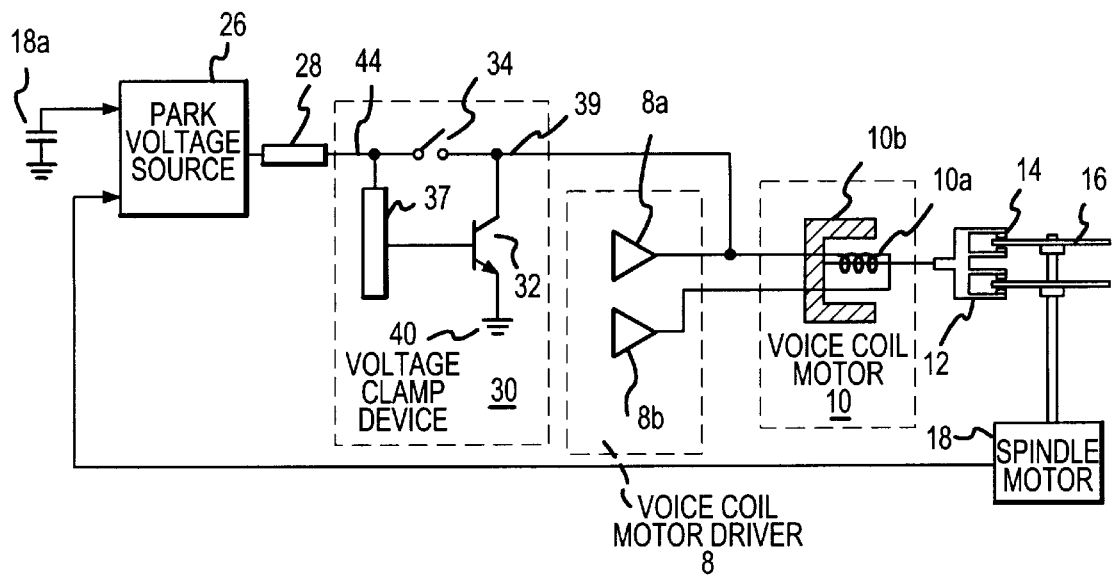
FIG. 3 is a symbolic diagram of a system for parking the heads of a disk drive with constant velocity.

A system for parking the heads of a disk drive with constant velocity according to an embodiment of the invention is shown in FIG. 3. Referring to FIG. 3, the constant velocity head parking system comprises hard disks 16, read/write heads 14, head assembly 12, a voice coil motor 10, a voice coil motor driver 8, a voltage clamp device 30, a park voltage resistive network 28, and a park voltage source 26.

The voltage clamp device 30 comprises an input terminal 44, an output terminal 39, a first transistor 32, a switch 34, and a voltage divider 37. The first transistor 32 comprises a clamp terminal coupled to the voltage clamp device output terminal 39, a reference terminal coupled to a voltage reference 40 (for example, ground), and a control terminal. The switch 34 is coupled between the voltage clamp device input terminal 44 and the voltage clamp device output terminal 39. The voltage divider 37 has an input terminal coupled to the voltage clamp device input terminal 44 and an output terminal coupled to the control terminal of the first transistor 32.

The voice coil motor 10 contains a voice coil 10a nested within a fixed permanent magnet 10b. Under normal operating conditions where information is being written to or read from the hard disks 16, the voice coil motor 10 is energized by a voice coil motor driver 8 that contains, in preferred embodiments, a first driver 8a and a second driver 8b. During these normal read/write operations, the first driver 8a and second driver 8b are configured by control logic (not shown) to produce a current flow through the voice coil motor 10. This current flow magnetizes the voice coil 10a within the voice coil motor 10 and causes the voice coil 10a to push or pull on the fixed permanent magnet 10b. These forces of repulsion or attraction cause the voice coil 10a to move in relation to the permanent fixed magnet 10b. Because the voice coil 10a is fixedly attached to the read/write heads 14, movement of the voice coil 10a results in movement of the heads 14 in relation to the hard disks 16. By properly sequencing the configuration of first driver 8a and second driver 8b, the read/write heads 14 can be moved from one track to another on the hard disks 16.

Under power-down conditions when the read/write heads 14 are to be parked, a park voltage source 26 typically generated by stored energy in the spindle motor 18 or a storage capacitor 18a is applied by the closing of a switch (not shown in FIG. 3) to the input terminal 44 of the voltage clamp device 30 through the park voltage resistive network 28. The voltage at the voltage clamp device input terminal 44 closes the switch 34 and allows current to flow through the closed switch 34 to the clamp terminal of the first transistor 32. The voltage at the voltage clamp device input terminal 44 is also divided down with the voltage divider 37. The divided-down voltage at the voltage divider output terminal activates the control terminal of the first transistor 32 and allows a regulated amount of current to flow from the clamp terminal to the reference terminal of the first transistor 32. Because of this current, a voltage develops across the clamp and reference terminals of the first transistor 32 and also at the voltage clamp device output terminal 39. This voltage remains generally constant even though the voltage at the voltage clamp device input terminal 44 varies, because the voltage divider 37 compensates for voltage changes at the voltage clamp device input terminal 44 by changing the amount of current flowing from the clamp terminal to the reference terminal of the first transistor 32. This constant voltage is then applied to the voice coil motor 10.

The constant voltage across the voice coil motor 10 produces a current flow through the voice coil 10a that magnetizes the voice coil 10a and causes the voice coil 10a to push or pull on the fixed permanent magnet 10b. These forces of repulsion or attraction cause the voice coil 10a to move with constant velocity in relation to the permanent fixed magnet 10b, and also cause the read/write heads 14 to move with constant velocity in relation to the hard disks 16 toward the park position.

Figure 4:
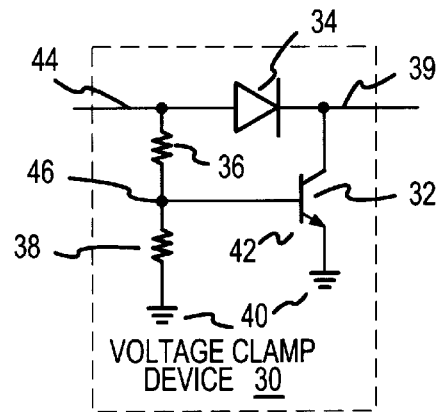
FIG. 4 is a schematic diagram of an embodiment of a voltage clamp device for parking the heads of a disk drive with constant velocity.

In an embodiment of a voltage clamp device 30 for parking the read/write heads 14 of a disk drive with constant velocity shown in FIG. 4, the switch 34 and voltage divider 37 of FIG. 3 have been replaced by a diode 34, first resistor 36, and a second resistor 38 connected at one end to a voltage reference 40. The clamp, control, and reference terminals of the transistor 32 of FIG. 3 have also been replaced by collector, base, and emitter terminals, respectively. When a voltage $V_{44}$ is applied to the input terminal 44 of the voltage clamp device 30, the voltage $V_{44}$ forward-biases the diode 34. The first resistor 36 and second resistor 38 act as a voltage divider such that a voltage $V_{46}$ appears at node 46 and is approximately equal to $V_{44}(R_{38}/(R_{36}+R_{38}))$, where $R_{36}$ is the resistance of the first resistor 36 and $R_{38}$ is the resistance of the second resistor 38. As FIG. 4 illustrates, $V_{46}$ is also equal to $V_{BE1}$, the voltage across the base and emitter terminals of the first transistor 32. A sufficiently large $V_{BE1}$ will forward-bias the base-emitter junction 42 of the first transistor 32, turning on first transistor 32 and allowing increased current to flow from the collector terminal to the emitter terminal of first transistor 32.

The voltage (identified as $V_{CE1}$) that develops across the collector and emitter terminals of first transistor 32 is equal to $V_{44}-V_D$, where $V_D$ is the voltage drop across the diode 34. Thus, $V_{44}=V_{CE1}+V_D$. Because $V_{BE1}=V_{44}(R_{38}/(R_{36}+R_{38}))$ as noted in the paragraph above, by manipulating the equation it is also true that $$V_{BE1}=(V_{CE1}+V_D)(R_{38}/(R_{36}+R_{38}))$$

and $$V_{CE1}=V_{BE1}((R_{36}+R_{38})/R_{38})-V_D.$$

In preferred embodiments, the diode 34 and first transistor 32 are selected such that $V_D$ is approximately equal to $V_{BE1}$, and thus $V_{CE1}=V_{BE1}(R_{36}/R_{38})$. Because $V_{BE1}$ is constant at approximately 0.6V when the base-emitter junction 42 is forward-biased during parking, $V_{CE1}$ is also constant during parking and is dependent only on the ratio of $R_{36}$ to $R_{38}$.

When the voltage clamp device 30 is part of the constant velocity head parking system of FIG. 3, during parking $V_{CE1}$ appears at the voltage clamp device output terminal 39 and across the voice coil 10a, and acts as a clamp voltage for the voice coil 10a. This constant voltage across the voice coil 10a moves both the voice coil 10a and the read/write heads 14 with constant velocity, minimal acceleration, and low gravitational forces, minimizing the mechanical stress on the heads 14 during parking.

The clamp voltage ($V_{CE1}$) is directly proportional to the velocity at which the voice coil 10a moves such that $V_{CE1}=k*Vel_{VC}$, where k is a constant and $Vel_{VC}$ is the velocity of the voice coil 10a. Therefore, the clamp voltage ($V_{CE1}$) can be adjusted to achieve a target park velocity by choosing $R_{36}$ and $R_{38}$ according to the formula $V_{CE1}=V_{BE1}(R_{36}/R_{38})$.

The above description assumes that in preferred embodiments, $V_D=V_{BE1}$. Differences in the value of $V_D$ and $V_{BE1}$ due to design or manufacturing differences between the diode 34 and first transistor 32 used in such preferred embodiments will result in a deviation between the target park velocity and the actual park velocity. An alternative preferred embodiment of the present invention, illustrated in FIG. 5, minimizes these differences and hence the error between the target park velocity and the actual park velocity.

Figure 5:
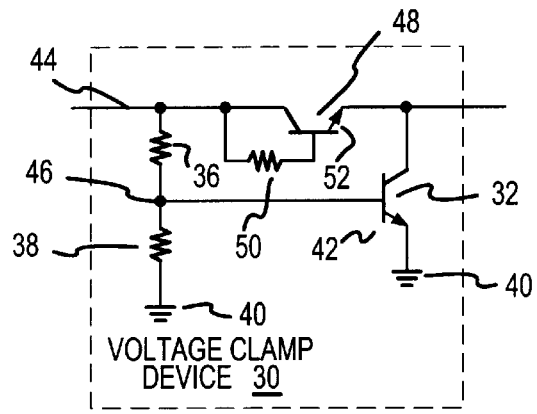
FIG. 5 is a schematic drawing of a preferred embodiment of a voltage clamp device using matched transistors for parking the heads of a disk drive with constant velocity.

The preferred embodiment of a voltage clamp device 30 for parking the read/write heads 14 of a disk drive with constant velocity shown in FIG. 5 is identical to that of FIG. 4, except that the diode 34 of FIG. 4 has been replaced by a second transistor 48 and third resistor 50 in FIG. 4. The second transistor 48 has an collector terminal coupled to the first end of the first resistor 36 and a first end of the third resistor 50, a base terminal coupled to a second end of the third resistor 50, and an emitter terminal coupled to the collector terminal of the first transistor 32.

In the preferred embodiment of FIG. 5, the second transistor 48 is chosen to have a design and fabrication process similar to the first transistor 32. When a voltage $V_{44}$ is applied to the input terminal 44 of the voltage clamp device 30, the voltage $V_{44}$ forward-biases a base-emitter junction 52 of the second transistor 48. The third resistor 50 limits the current flowing into the base terminal of the second transistor 48 to a safe value. The voltage (identified as $V_{CE2}$) across the collector and emitter terminals of second transistor 48 is approximately equal to the voltage (identified as $V_{BE2}$) across the base-emitter junction 52 of the second transistor 48. This approximation ($V_{CE2}=V_{BE2}$) can be made due to the small amount of current flowing through the third resistor 50 and into the base terminal of the second transistor 48. Because $V_{BE2}=V_{BE1}$ due to the closely matched properties of the first transistor 32 and second transistor 48, it is also true that $V_{CE2}=V_{BE1}$. By substituting $V_{CE2}$ for $V_D$ and making the assumption that $V_{CE2}=V_{BE1}$ in the equations associated with FIG. 4, the equation $V_{CE1}=V_{BE1}(R_{36}/R_{38})$ is again derived for FIG. 5.

Therefore, as in FIG. 4, the clamp voltage ($V_{CE1}$) in FIG. 5 can be adjusted to achieve a target park velocity by choosing $R_{36}$ and $R_{38}$ according to the formula $V_{CE1}=V_{BE1}(R_{36}/R_{38})$. However, the preferred embodiment of FIG. 5 will generally be able to produce a more accurate park velocity than the embodiment of FIG. 4 because of the matched properties of the first transistor 32 and second transistor 48.

The foregoing description of preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A system for moving a plurality of heads in a disk drive, the system comprising:

a plurality of disks for storing data;

a plurality of heads for reading data from or writing data to the disks;

a voice coil motor for moving the plurality of heads, the voice coil motor having a voice coil with a first end and a second end;

a voice coil motor driver for providing a voltage across the voice coil during read/write operations, wherein the voice coil motor driver is coupled to both the first end and the second end of the voice coil;

a voltage clamp device for providing a generally constant voltage across the voice coil during head parking, wherein the voltage clamp device is coupled to the first end of the voice coil;

a park voltage source for energizing the voltage clamp device; and a park voltage resistive network for coupling the park voltage source to the voltage clamp device, wherein a first end of the park voltage resistive network is coupled to the park voltage source, and a second end of the park voltage resistive network is coupled to the voltage clamp device;

wherein the voltage clamp device comprises:
 a device input terminal for receiving a time varying voltage;
 a device output terminal for providing a generally constant voltage signal;
 a voltage divider having an input terminal coupled to the device input terminal and an output terminal for providing a time varying control voltage;
 a first transistor having a clamp terminal coupled to the device output terminal, a control terminal coupled to the voltage divider output terminal, and a reference terminal coupled to a voltage reference; and
 a switch coupled between the device input terminal and the device output terminal for enabling the first transistor.

2. The system of claim 1, wherein the voice coil motor driver comprises a first driver coupled to the first end of the voice coil and a second driver coupled to the second end of the voice coil.

3. The system of claim 1, wherein the park voltage source comprises a storage capacitor.

4. The system of claim 1, wherein the park voltage source comprises a spindle motor.

5. The system of claim 1, wherein the voltage divider further comprises:
 a first resistive network coupled between the voltage divider input terminal and the voltage divider output terminal;
 a voltage divider reference terminal coupled to a voltage reference; and
 a second resistive network coupled between the voltage divider output terminal and the voltage divider reference terminal.

6. The system of claim 1, wherein the control terminal of the first transistor is replaced by a base terminal, the clamp terminal of the first transistor is replaced by a collector terminal, and the reference terminal of the first transistor is replaced by an emitter terminal.

7. The system of claim 1, wherein the switch comprises a diode with an anode terminal coupled to the device input terminal and a cathode terminal coupled to the device output terminal.

8. The system of claim 1, wherein the switch comprises:
 a second transistor having a collector terminal coupled to the device input terminal, a base terminal, and an emitter terminal coupled to the device output terminal; and
 a third resistor having a first end coupled to the collector terminal of the second transistor and a second end coupled to the base terminal of the second transistor.

9. A method for moving a plurality of heads in a disk drive, the method comprising:
 applying a voltage across a voice coil motor with a voice coil motor driver during read/write operations;
 applying a generally constant voltage across the voice coil motor with a voltage clamp device during head parking;
 moving a voice coil within the voice coil motor as a result of the voltage across the voice coil motor; and
 moving the heads as a result of movement of the voice coil;
 wherein the step of applying a generally constant voltage across a voice coil motor with the voltage clamp device during head parking further comprises the steps of:
  applying a time-varying input voltage from the park voltage source to the voltage clamp device,
  closing a switch with the time-varying input voltage,
  flowing current through the closed switch to a clamp terminal of a first transistor,
  dividing down the time-varying input voltage with a voltage divider,
  activating a control terminal of the first transistor with the divided-down time-varying input voltage;
  flowing a time-varying amount of current from the clamp terminal of the first transistor to a reference terminal of the first transistor, the amount dependent on the divided-down time-varying input voltage appearing at the control terminal of the first transistor;
  forcing a generally constant voltage to develop at the clamp terminal of the first transistor by varying the amount of current flowing from the clamp terminal of the first transistor to the reference terminal of the first transistor in response to changes in the time-varying input voltage; and
  applying the generally constant voltage at the clamp terminal to the voice coil motor.

10. The method of claim 9, wherein the step of applying a voltage across a voice coil motor with a voice coil motor driver during read/write operations further comprises the steps of:
 configuring a first driver coupled to a first end of the voice coil motor to be either a current source or sink;
 configuring a second driver coupled to a second end of the voice coil motor to be either a current sink or source, wherein the first and second drivers are never simultaneously both current sinks or sources; and
 sequencing the configuration of the first and second drivers such that they produce a voltage across the voice coil motor.

11. The method of claim 9, wherein the step of moving a voice coil within the voice coil motor as a result of the voltage across the voice coil motor further comprises:
 magnetizing the voice coil by applying a voltage across the voice coil motor;
 creating forces of attraction or repulsion between the voice coil and a fixed permanent magnet within the voice coil motor by magnetizing the voice coil; and
 moving the voice coil in relation to the fixed permanent magnet due to the forces of attraction and repulsion between the magnetized voice coil and the fixed permanent magnet.

12. The method of claim 9, wherein the step of moving the heads as a result of the movement of the voice coil motor further comprises:
 fixedly attaching the heads to a voice coil located within the voice coil motor such that the heads move in concert with movement of the voice coil.

13. A voltage clamp device for providing a constant voltage across a voice coil motor during head parking, the voltage clamp device comprising:
 a device input terminal for receiving a time varying voltage;
 a device output terminal for providing a generally constant voltage signal;

a voltage divider having an input terminal coupled to the device input terminal and an output terminal for providing a time varying control voltage;

a first transistor having a clamp terminal coupled to the device output terminal, a control terminal coupled to the voltage divider output terminal, and a reference terminal coupled to a voltage reference; and a switch coupled between the device input terminal and the device output terminal for enabling the first transistor.

14. The voltage clamp device of claim 13, wherein the control terminal of the first transistor is replaced by a base terminal, the clamp terminal of the first transistor is replaced by a collector terminal, and the reference terminal of the first transistor is replaced by an emitter terminal.

15. The voltage clamp device of claim 13, wherein the switch comprises a diode with an anode terminal coupled to the device input terminal and a cathode terminal coupled to the device output terminal.

16. The voltage clamp device of claim 14, wherein the switch comprises:

a second transistor having a collector terminal coupled to the device input terminal, a base terminal, and an emitter terminal coupled to the device output terminal; and a third resistor having a first end coupled to the collector terminal of the second transistor and a second end coupled to the base terminal of the second transistor.

* * * * *